US006289340B1

(12) United States Patent
Puram et al.

(10) Patent No.: US 6,289,340 B1
(45) Date of Patent: Sep. 11, 2001

(54) CONSULTANT MATCHING SYSTEM AND METHOD FOR SELECTING CANDIDATES FROM A CANDIDATE POOL BY ADJUSTING SKILL VALUES

(75) Inventors: Kamala Puram, Edina; Gopal Sadagopal, Bloomington, both of MN (US)

(73) Assignee: IXMatch, Inc., Bloomington, MN (US)

( * ) Notice: Subject to any disclaimer, the term of this patent is extended or adjusted under 35 U.S.C. 154(b) by 0 days.

(21) Appl. No.: 09/365,787

(22) Filed: Aug. 3, 1999

(51) Int. Cl.[7] ........................................... G06F 17/30
(52) U.S. Cl. ..................... 707/5; 707/104; 705/7; 705/8; 705/11
(58) Field of Search .................. 707/104, 5, 6; 705/1, 8, 9, 11, 7, 36, 37

(56) References Cited

U.S. PATENT DOCUMENTS

| | | |
|---|---|---|
| 5,164,897 * 11/1992 | Clark et al. | 705/1 |
| 5,197,004 * 3/1993 | Sobotka et al. | 705/8 |
| 5,416,694 * 5/1995 | Parrish et al. | 705/8 |
| 5,664,115 9/1997 | Fraser . | |
| 5,778,364 7/1998 | Nelson . | |
| 5,862,223 1/1999 | Walker et al. . | |
| 5,884,305 3/1999 | Kleinberg et al. . | |
| 5,890,129 3/1999 | Spurgeon . | |
| 5,890,138 3/1999 | Godin et al. . | |
| 5,890,149 3/1999 | Schmonsees . | |
| 5,894,556 4/1999 | Grimm et al. . | |
| 5,918,207 * 6/1999 | McGovern et al. | 705/1 |
| 6,049,776 * 4/2000 | Donnelly et al. . | |

OTHER PUBLICATIONS

"Expert Systems for Human Resources Management: Development and Implementation," Mockler et al., Proceedings of the 1992 Twenty–Fifth International Conference on System Sciences, pp. 129–132, Jan. 1992.*

"SkillView Technologies' SkillView 2.0 tracks employee skills," Lynn Greiner, Computing Canada, v24, n6, pp. 34–35, Feb. 1998.*

Internet Page, Employment Planet, http://www.employmentplanet.com, p. 1 Downloaded on Dec. 1, 1999.

* cited by examiner

Primary Examiner—Hosain T. Alam
(74) Attorney, Agent, or Firm—Beck & Tysver, P.L.L.C.

(57) ABSTRACT

An apparatus, system and method selects a candidate from a pool of candidates to fill a position based on the skills held by the candidate, the skills desired for the position and the priority of the skills for the position. Pre-defined lists of skills are used to develop detailed profiles of the candidates and the positions to be filled for better matching. To compare and rank candidates, adjusted skills scores are used which are limited by the priority of the skill for the position, yielding best-fit matches.

5 Claims, 12 Drawing Sheets

PRE-RANKED VALIDATED SKILLS ASSESSMENT VALUES — 210

| | SKILL CATEGORY | SKILL DESCRIPTION | SKILL LEVEL | MAX SCORE | CANDIDATE1 | CANDIDATE2 | CANDIDATE3 | CANDIDATE4 | CANDIDATE5 |
|---|---|---|---|---|---|---|---|---|---|
| 1 | HARDWARE | HARDWARE - NT | EXPERIENCED | 5 | 10 | 10 | 10 | 2 | 5 |
| 2 | LANGUAGE | LANG. - SM. TALK | CORE STRENGTH | 10 | 10 | 10 | 10 | 5 | 5 |
| 3 | METHODOLOGY | METHOD 1 | BENEFICIAL | 2 | 10 | 3 | 10 | 10 | 10 |
| 4 | ARCHITECTURE | CLIENT SERVER | EXPERIENCED | 5 | 5 | 2 | 5 | 10 | 5 |
| 5 | WRITTEN COMM. | DESIGN DOCUMENTS | CORE STRENGTH | 10 | 2 | 10 | 5 | 10 | 10 |
| 6 | BUSINESS | AIRLINES | BENEFICIAL | 2 | 2 | 2 | 2 | 2 | 10 |
| 7 | PROJECT | REQ. GATHERING | CORE STRENGTH | 10 | 0 | 10 | 5 | 2 | 10 |
| 8 | PROJECT | ANALYSIS | EXPERIENCED | 5 | 5 | 5 | 5 | 5 | 10 |
| 9 | | | | | | | | | |

RANKED SKILLS ASSESSMENT VALUES

| | SKILL CATEGORY | SKILL DESCRIPTION | SKILL LEVEL | MAX SCORE | CANDIDATE1 | CANDIDATE2 | CANDIDATE3 | CANDIDATE4 | CANDIDATE5 |
|---|---|---|---|---|---|---|---|---|---|
| 1 | HARDWARE | HARDEWARE - NT | EXPERIENCE | 5 | 5 | 5 | 5 | 2 | 5 |
| 2 | LANGUAGE | LANG. - SM. TALK | CORE STRENGTH | 10 | 10 | 10 | 10 | 5 | 5 |
| 3 | METHODOLOGY | METHOD 1 | BENEFICIAL | 2 | 2 | 2 | 2 | 2 | 2 |
| 4 | ARCHITECTURE | CLIENT SERVER | EXPERIENCED | 5 | 5 | 2 | 5 | 5 | 5 |
| 5 | WRITTEN COMM. | DESIGN DOCUMENTS | CORE STRENGTH | 10 | 2 | 10 | 5 | 10 | 10 |
| 6 | BUSINESS | AIRLINES | BENEFICIAL | 2 | 2 | 2 | 2 | 2 | 2 |
| 7 | PROJECT | REQ. GATHERING | CORE STRENGTH | 10 | 0 | 10 | 5 | 2 | 10 |
| 8 | PROJECT | ANALYSIS | EXPERIENCED | 5 | 5 | 5 | 5 | 5 | 5 |
| 9 | | | | | | | | | |
| | TOTAL SCORE | | | 49 | 31 | 46 | 39 | 33 | 44 |
| | NORMALIZED SCORE | | | 2.04 | 63% | 94% | 80% | 67% | 90% |

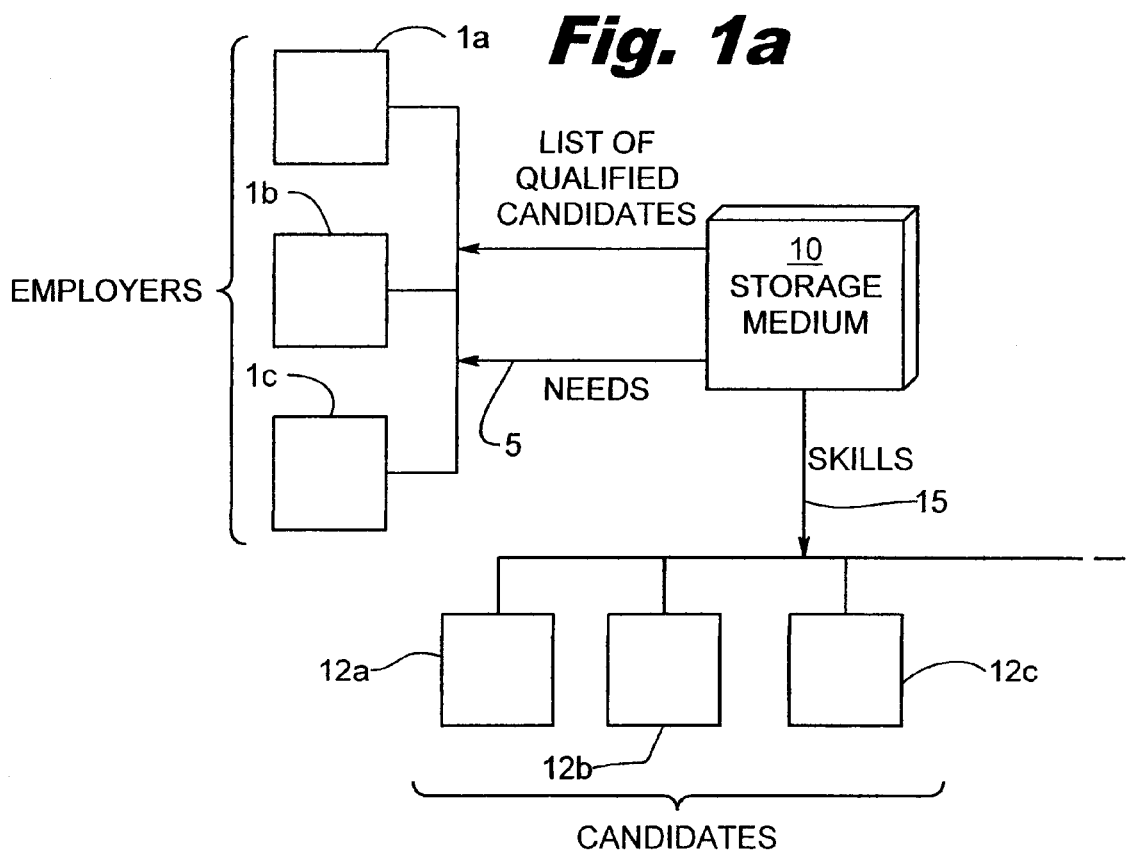
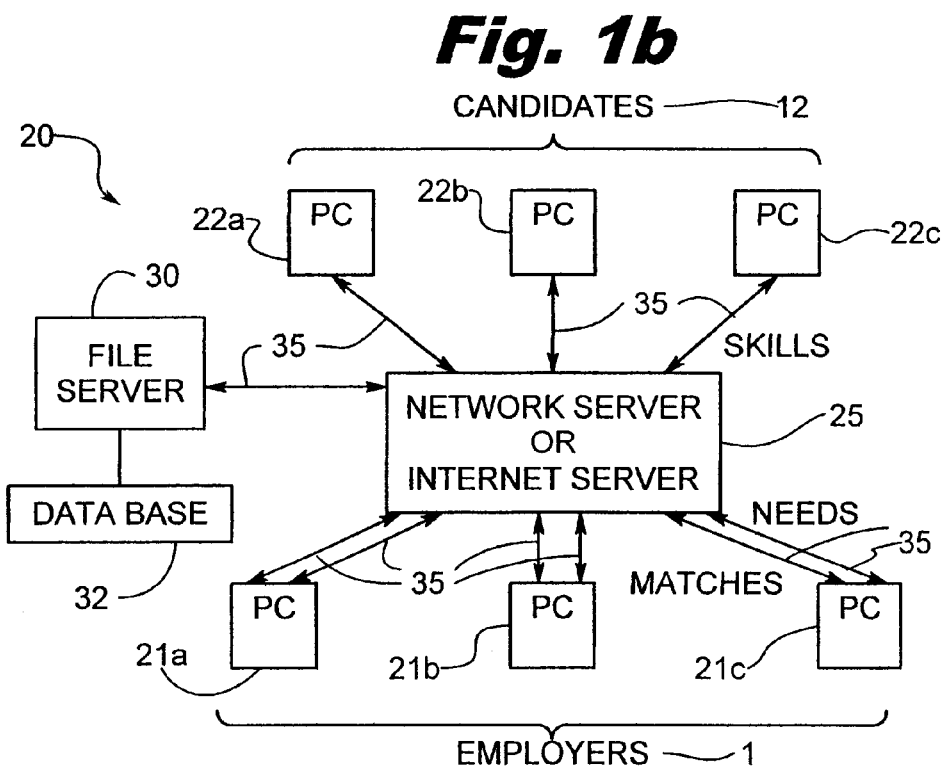

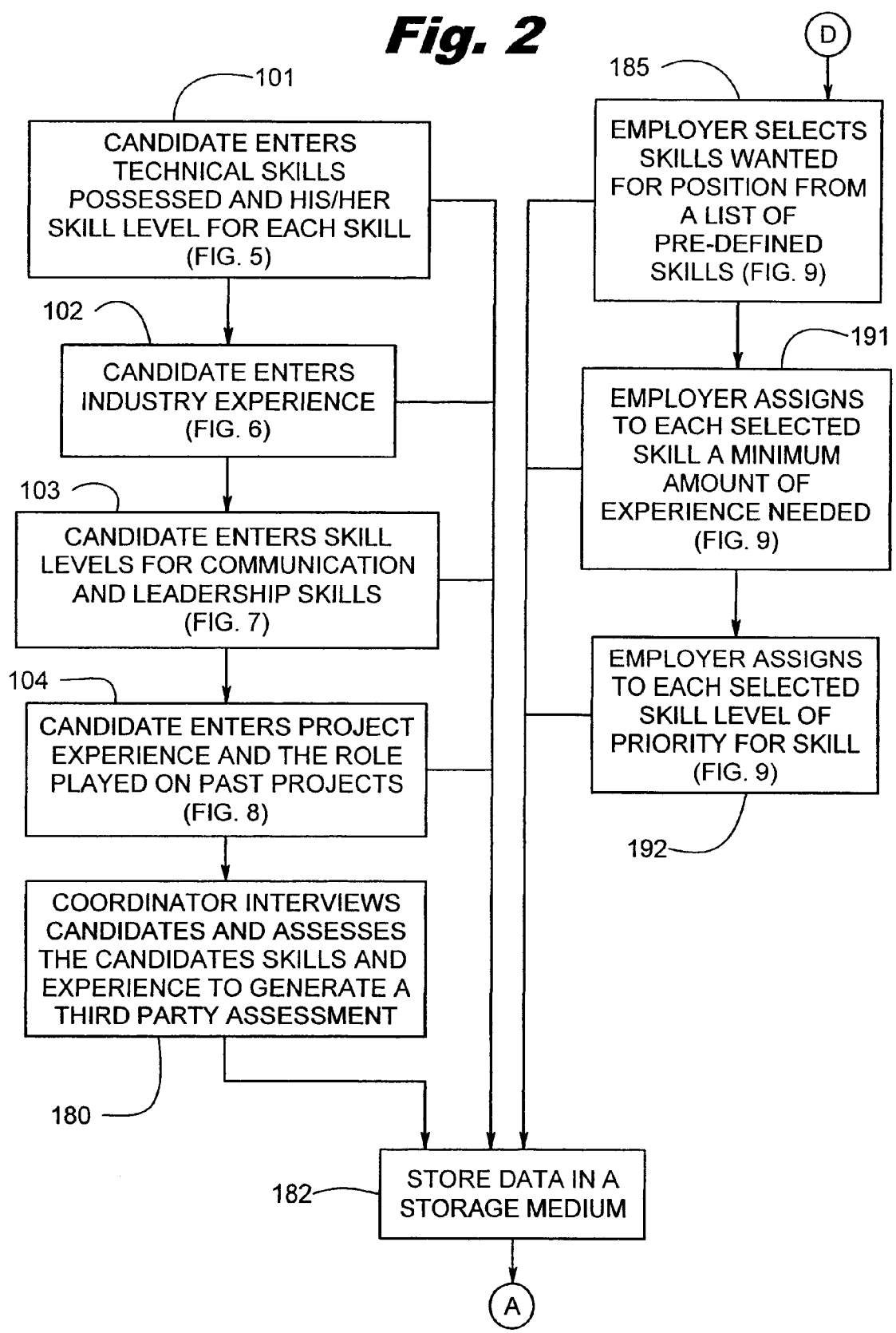

Fig. 5

CONSULTANT TECH. SKILL EVAL.

| TECHNICAL CATEGORIES | # OF YEARS | SELF ASSESSED SKILL LEVEL | EV ASSESSED SKILL LEVEL |
|---|---|---|---|
| HARDWARE | | | |
| 1 | | | |
| 2 | | | |
| 3 | | | |
| 4 | | | |
| 5 | | | |
| OPERATING SYSTEM | | | |
| 1 | | | |
| 2 | | | |
| 3 | | | |
| 4 | | | |
| 5 | | | |
| LANGUAGES | | | |
| 1 | | | |
| 2 | | | |
| 3 | | | |
| 4 | | | |
| 5 | | | |
| APPLICATIONS | | | |
| 1 | | | |
| 2 | | | |
| 3 | | | |
| 4 | | | |
| 5 | | | |
| 6 | | | |
| 7 | | | |
| OTHERS - TESTING, ARCHITECTURE, TOOLS, METHODOLIES, CERTIFICATIONS, DATABASE ETC. | | | |
| 1 | | | |
| 2 | | | |
| 3 | | | |
| 4 | | | |
| 5 | | | |

DEFINITION OF SKILL LEVEL
1 = NOVICE
2 = LIMITED
3 = EXPERIENCED
4 = EXPERT

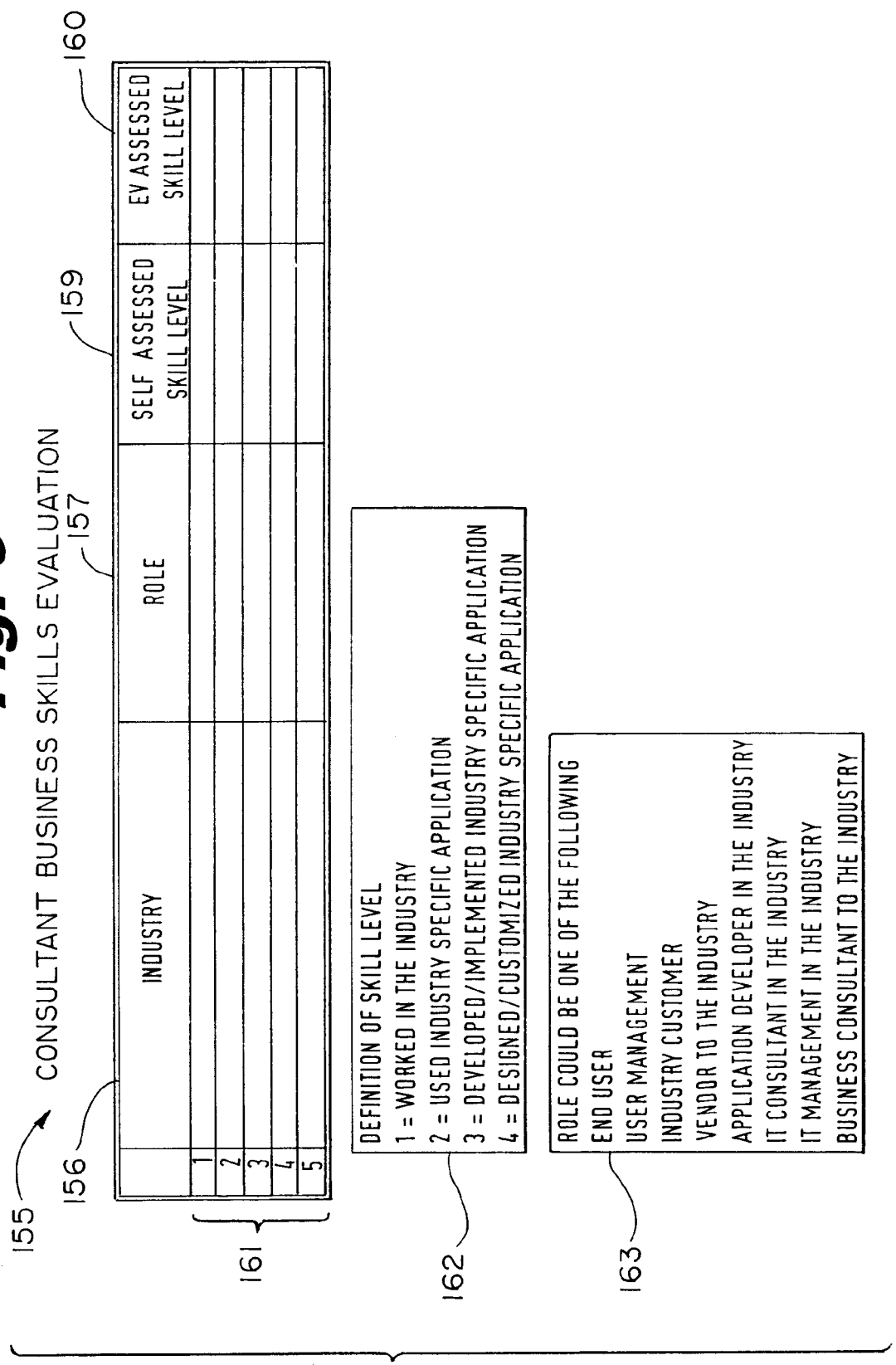

Fig. 7

CONSULTANT COMMUNICATION SKILLS EVALUATION

| | COMMUNICATION | SELF ASSESSED SKILL LEVEL | EV ASSESSED SKILL LEVEL |
|---|---|---|---|
| | WRITTEN COMMUNICATION SKILLS | | |
| 1 | BUSINESS REQUIREMENTS | | |
| 2 | DESIGN DOCUMENTS | | |
| 3 | STATUS REPORTS | | |
| 4 | GENERAL OBSERVATION | | |
| | | | |
| | VERBAL COMMUNICATIONS | | |
| 1 | TEAM PRESENTATIONS | | |
| 2 | STATUS UPDATES | | |
| 3 | ISSUE RESOLUTION | | |
| 4 | GENERAL OBSERVATION | | |
| | | | |
| | PROJECT LEADERSHIP | | |
| 1 | TEAM LEADERSHIP | | |
| 2 | RUN STATUS MEETINGS | | |
| 3 | PROJECT PLANNING | | |
| 4 | RUN ISSUES RESOLUTION PROCESS | | |
| 5 | MANAGEMENT REPORTING | | |
| 6 | PROJECT FUNDING REQUESTS | | |

SKILL LEVEL
NOT APPLICABL
PRATICIPATED
RESPONSIBLE FOR CERTAIN SECTIONS
MANAGED

Fig. 8

CONSULTANT PROJECT EXPERIENCE EVALUTION 172

PROJECT EXPERIENCE 173   LIST LAST 3 PROJECTS 176

|  | PROJECT 1 | PROJECT 2 | PROJECT 3 |
|---|---|---|---|
| TOTAL LENGTH OF THE PROJECT |  |  |  |
| LENGTH OF YOUR INVOLVEMENT IN THE PROJECT |  |  |  |
| REQUIREMENT GATHERING |  |  |  |
| USER INTERFACE DESIGN |  |  |  |
| BUSINESS REENGINEERING |  |  |  |
| PROJECT PLANNING |  |  |  |
| SYSTEM ARCHITECTURE |  |  |  |
| APPLICATION ARCHITECTURE |  |  |  |
| MODELING |  |  |  |
| FUNCTIONAL DESIGN |  |  |  |
| DATA MODELING |  |  |  |
| DETAILED DESIGN |  |  |  |
| CODING AND DEVELOPMENT |  |  |  |
| TRAINING DEVELOPMENT |  |  |  |
| INFRASTRUCTURE DEVELOPMENT |  |  |  |
| PERFORMANCE TUNING |  |  |  |
| TESTING AND QUALITY ASSURANCE |  |  |  |
| IMPLEMENTATION |  |  |  |
| ROLLOUT |  |  |  |
| PRODUCTION SUPPORT |  |  |  |
| MAINTENANCE AND ENHANCEMENTS |  |  |  |

SELECT THE AREAS YOU PARTICIPATED IN EACH OF THE PROJECTS.

Fig. 9

CORPORATION REQUIREMENTS IDENTIFICATION QUESTIONNAIRE

| SKILL CATEGORY (SAMPLE SHOWN) ~187 | MINIMUM EXPERIENCE LEVEL ~188 | SKILL LEVEL NEEDED CORE STRENGTH EXPERIENCED/ BENEFICIAL ~189 |
|---|---|---|
| HARDWARE | | |
| 1 | | |
| 2 | | |
| 3 | | |
| OPERATING SYSTEM | | |
| 1 | | |
| 2 | | |
| LANGUAGES | | |
| 1 | | |
| 2 | | |
| WRITTEN SKILLS | | |
| 1 | | |
| 2 | | |
| VERBAL SKILLS | | |
| 1 | | |
| 2 | | |
| PROJECT LEADERSHIP | | |
| 1 | | |
| 2 | | |
| PROJECT EXPERIENCE | | |
| 1 | | |
| 2 | | |
| 3 | | |
| 4 | | |
| 5 | | |

186 ↗

190 (bracket covering left column rows)

Fig. 10

MATCHING SCORING SYSTEM RESULTS

| SKILL CATEGORY | SKILL DESCRIPTION | SKILL LEVEL | MINIMUM REQUIRED EXPERIENCE | MAXIMUM SCORE |
|---|---|---|---|---|
| 1 HARDWARE | HARDWARE - NT | EXPERIENCED | | 5 |
| 2 LANGUAGE | LANGUAGE - SMALLTALK | CORE STRENGTH | | 10 |
| 3 METHODOLOGY | METHOD 1 | BENEFICIAL | | 2 |
| 4 ARCHITECTURE | CLIENT SERVER | EXPERIENCED | | 5 |
| 5 WRITTEN COMMUNICATION | DESIGN DOCUMENTS | CORE STRENGTH | | 10 |
| 6 BUSINESS | AIRLINES | BENEFICIAL | | 2 |
| 7 PROJECT | REQUIREMENTS GATHERING | CORE STRENGTH | | 10 |
| 8 PROJECT | ANALYSIS | EXPERIENCED | | 5 |
| 9 | | | | |
| 10 | | | | |
| TOTAL MAXIMUM POSSIBLE SCORE | | | | 49 |
| NORMALIZATION FACTOR | | | | 2.04 |

Fig. 11a

PRE-RANKED VALIDATED SKILLS ASSESSMENT VALUES ~210

| | SKILL CATEGORY | SKILL DESCRIPTION | SKILL LEVEL | MAX SCORE | CANDIDATE1 | CANDIDATE2 | CANDIDATE3 | CANDIDATE4 | CANDIDATE5 |
|---|---|---|---|---|---|---|---|---|---|
| 1 | HARDWARE | HARDWARE - NT | EXPERIENCED | 5 | | | | | 5 |
| 2 | LANGUAGE | LANG. - SM. TALK | CORE STRENGTH | 10 | 10 | 10 | 10 | 2 | 5 |
| 3 | METHODOLOGY | METHOD 1 | BENEFICIAL | 2 | 10 | 3 | 10 | 10 | 10 |
| 4 | ARCHITECTURE | CLIENT SERVER | EXPERIENCED | 5 | 5 | 2 | 5 | 10 | 5 |
| 5 | WRITTEN COMM. | DESIGN DOCUMENTS | CORE STRENGTH | 10 | 2 | 10 | 2 | 10 | 10 |
| 6 | BUSINESS | AIRLINES | BENEFICIAL | 2 | 2 | 2 | 5 | 2 | 10 |
| 7 | PROJECT | REQ. GATHERING | CORE STRENGTH | 10 | 0 | 10 | 5 | 2 | 10 |
| 8 | PROJECT | ANALYSIS | EXPERIENCED | 5 | 5 | 5 | 5 | 5 | 10 |
| 9 | | | | | | | | | |

Fig. 11b

RANKED SKILLS ASSESSMENT VALUES

| | SKILL CATEGORY | SKILL DESCRIPTION | SKILL LEVEL | MAX SCORE | CANDIDATE1 | CANDIDATE2 | CANDIDATE3 | CANDIDATE4 | CANDIDATE5 |
|---|---|---|---|---|---|---|---|---|---|
| 1 | HARDWARE | HARDWARE - NT | EXPERIENCE | 5 | | | | | 5 |
| 2 | LANGUAGE | LANG. - SM. TALK | CORE STRENGTH | 10 | 10 | 10 | 10 | 2 | 5 |
| 3 | METHODOLOGY | METHOD 1 | BENEFICIAL | 2 | 2 | 2 | 2 | 2 | 2 |
| 4 | ARCHITECTURE | CLIENT SERVER | EXPERIENCED | 5 | 5 | 2 | 5 | 5 | 5 |
| 5 | WRITTEN COMM. | DESIGN DOCUMENTS | CORE STRENGTH | 10 | 2 | 10 | 2 | 10 | 10 |
| 6 | BUSINESS | AIRLINES | BENEFICIAL | 2 | 2 | 2 | 2 | 2 | 2 |
| 7 | PROJECT | REQ. GATHERING | CORE STRENGTH | 10 | 0 | 10 | 5 | 2 | 10 |
| 8 | PROJECT | ANALYSIS | EXPERIENCED | 5 | 5 | 5 | 5 | 5 | 5 |
| 9 | | | | | | | | | |
| | TOTAL SCORE | | | 49 | 31 | 46 | 39 | 33 | 44 |
| | NORMALIZED SCORE | | | 2.04 | 63% | 94% | 80% | 67% | 90% |

US 6,289,340 B1

CONSULTANT MATCHING SYSTEM AND METHOD FOR SELECTING CANDIDATES FROM A CANDIDATE POOL BY ADJUSTING SKILL VALUES

FIELD OF THE INVENTION

The present invention relates generally to a method and system for selecting a candidate from a pool of candidates to fill a position and more particularly to a computer-hosted method and system for generating and storing profiles of candidates based on skills and experience, generating and storing a skills profile for a position to be filled, adjusting the skills profile of candidates based on levels of skills needed, and comparing candidates based on their adjusted profiles.

BACKGROUND OF THE INVENTION

A number of web sites exist for matching job candidates to jobs or positions. These systems collect resume data from candidates and a job description from an employer. These services provide rudimentary matching that yields a high percentage of "matches" that are not necessarily qualified, or are overqualified, for given positions. What has been needed is a more sophisticated method and system for collecting data from candidates about their skills and data from employers about their needs. What has further been needed is a more finely tuned system and method of matching candidates to positions.

SUMMARY OF THE INVENTION

The apparatus, system and method of the present invention yield highly compatible matches that should be satisfying for both employers and employees. Employers will find candidates who possess the skills they need at the level required for the position. Candidates can step into these positions confident that they are qualified and that their knowledge and experience are valued. Further, this system and method produce conservation of skills: because employers are able to select candidates that "just fit" instead of those with the highest scores, jobs and positions can be staffed such that skills are not wasted where they are not needed. This leaves a more valuable pool of candidates from which to select for subsequent positions.

BRIEF DESCRIPTION OF THE DRAWINGS

An exemplary version of an apparatus, system and method for selecting a candidate from a pool of candidates for a position that an employer seeks to fill is shown in the figures wherein like reference numerals refer to equivalent structure or steps throughout, and wherein:

FIG. 1a is a schematic representation of an apparatus, system and method according to the present invention;

FIG. 1b shows exemplary hardware for implementing the apparatus, system and method of FIG. 1;

FIG. 2 is a flow chart illustrating the data gathering and verifying phase of the system and method according to the present invention;

FIG. 5 is an exemplary table for receiving and displaying data pertaining to a candidate's technical skills for use with the system and method of the present invention;

FIG. 6 is an exemplary table for receiving and displaying data pertaining to a candidate's industry experience for use with the system and method of the present invention;

FIG. 7 is an exemplary table for receiving and displaying data pertaining to a candidate's communication skills for use with the system and method of the present invention;

FIG. 8 is an exemplary table for receiving and displaying data pertaining to a candidate's project experience for use with the system and method of the present invention;

FIG. 9 is an exemplary table for receiving and displaying data pertaining to the skill level required for one or more skills needed for a position to be filled for use with the system and method of the present invention;

FIG. 10 is an exemplary table for displaying information used to compute the maximum possible score for a given position for use with the system and method of the present invention;

FIG. 11a is an exemplary table for displaying scores of a plurality of candidates for use with the system and method of the present invention; and FIG. 11b is an exemplary table for displaying adjusted scores of a plurality of candidates for use with the system and method of the present invention.

DETAILED DESCRIPTION OF PREFERRED EMBODIMENT(S)

Figure 1C:
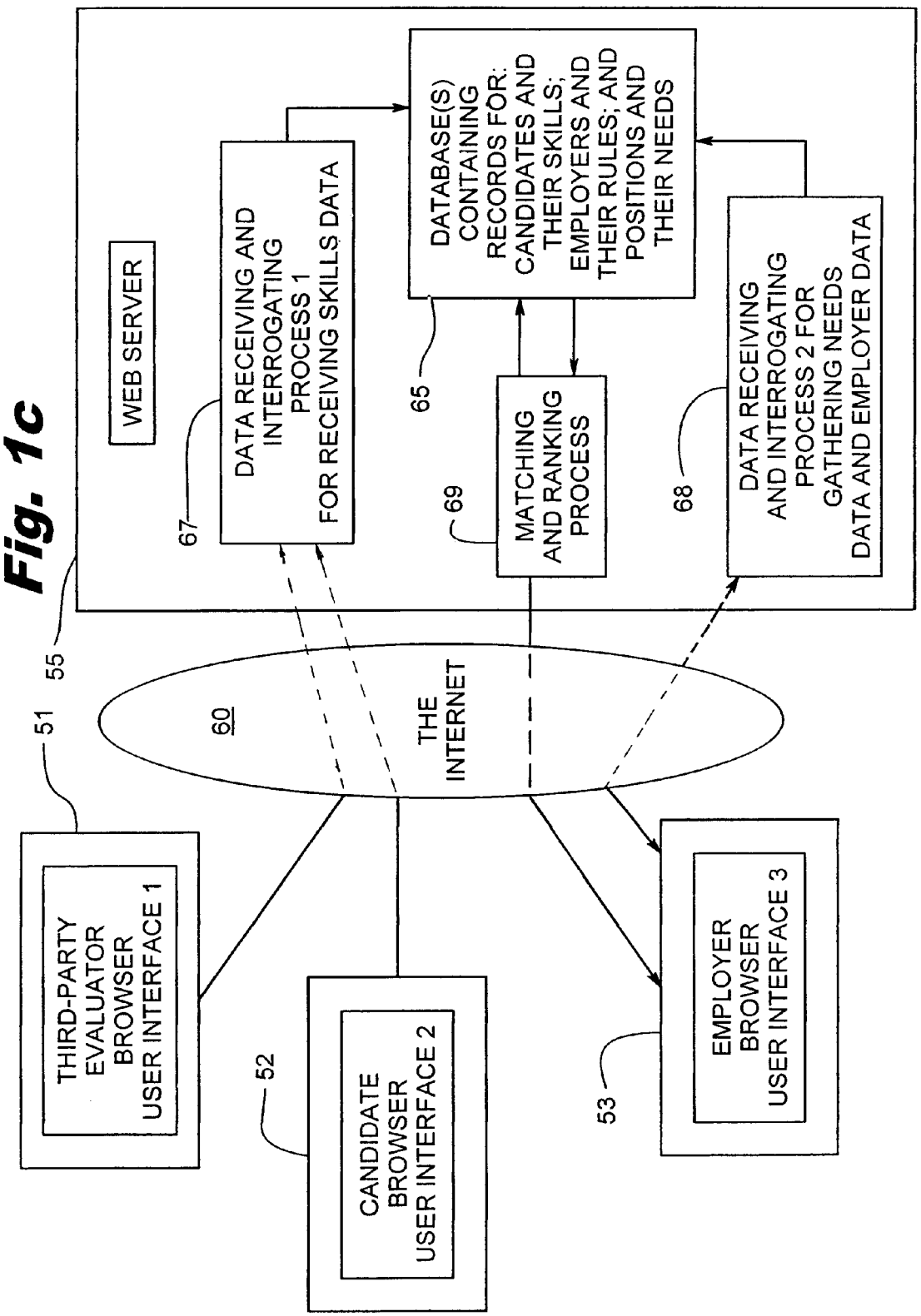
FIG. 1c is a schematic illustration of an apparatus, system and method according to the present invention.

An apparatus, method and system for finding and selecting a qualified candidate to fill a position is described. For purposes of illustration, the invention is described in the context of finding Information Technology (IT) professionals to fill contract positions in IT, but it will be understood that the system and method of the present invention can be applied in a variety of contexts.

The apparatus, system and method of the present invention use relational databases or database files to store, sort, search, and otherwise "mine" stored data. Examples of suitable database software that is commercially available include: Oracle, Access (made by Microsoft) and Filemaker Pro. In addition, the apparatus, system and method of the present invention can be implemented through the use of custom relationship database programs or software.

As illustrated in FIG. 1a, one or more employers, exemplified by reference numerals 1a, 1b, 1c, having one or more positions to be filled provide data regarding the skills desired ("needs"), the skill level or experience needed for desired skills for the position, and the importance or priority of that skill for the position. This "needs" data 5 is stored in a first storage medium 10. Independently, one or more people or "candidates" seeking positions, exemplified by reference numerals 12a, 12b, 12c, enter data regarding the skills they possess and the level of those skills. This "skills" data 15 is stored in a storage medium that is the same as, or is in data communication with, the first storage medium. The needs data and the skills data are stored on the storage medium in a relational database. Preferably, a system coordinator manages the database.

The apparatus, system and method of the present invention can be accomplished with a variety of hardware arrangements. A preferred arrangement 20 is illustrated in FIG. 1b. Employers 1 using PCs 21a–c and candidates 12 using PCs 22a–c are data connected to a server 25 to which data is supplied and retrieved by a file server 30 on which is stored a relational database 32. From the PCs 21, employers are able to enter needs data into the database 32. From the PCs 22, candidates are able to enter skills data into the database 32. Suitable graphical interfaces facilitate the candidates' and employers' ability to easily enter and view data.

The system incorporates security features that preclude one candidate from altering data entered by another candidate. Similarly, the system precludes one employer from altering data entered by another employer.

In a preferred embodiment, data connections 35 are made via the Internet. Alternative hardware configurations may be used to facilitate the device, method and system of the present invention. For example, the database may be stored as part of the file server 30 or may be a separate component communicating with the file server 30. Further examples of alternative hardware or hardware/software configurations include phone/voice-menu, hardwire Any hardware or hardware/software configuration that allows for data exchange can be used for this system and method.

As illustrated broadly in FIG. 1c, the apparatus, system and method of the present invention provide appropriate user interfaces 51, 52, 53 for the various users of the system. In a preferred embodiment one interface 52 is provided for the candidates, another and different interface 53 is provided for employers and another and different interface 51 is provided for experts who will provide third-party evaluations of the candidates as will be described below. In addition, yet another interface, not illustrated, may be added for the administrator of the system. In a preferred embodiment, these interfaces 51, 52, 53 are accessible to users through the internet browser. Further, in a preferred embodiment, data is exchanged between the users and a server 55 through the internet 60. The server 55 carries or is able to access one or more databases 65 which store and process data about the candidates and the positions to be filled. Several processes are performed by the server or another computer, including gathering and interrogating data from candidates 67, gathering and interrogating data from employers about positions to be filled 68, and then searching the database to find and rank candidates whose qualifications suit the needs of the positions to be filled 69.

Figure 3:
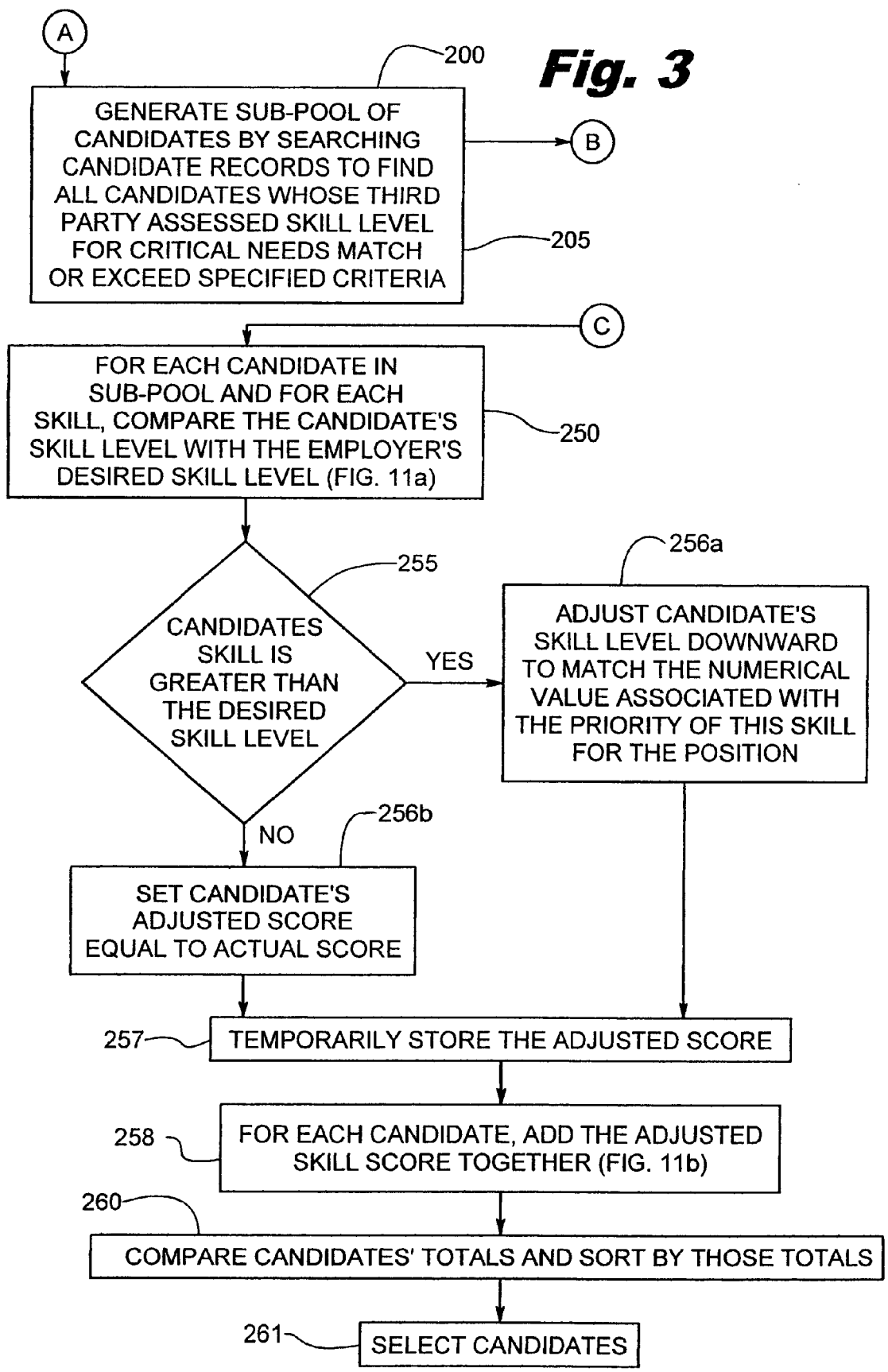
FIG. 3 is a flow chart illustrating the data matching phase of the system and method according to the present invention.
Figure 4:
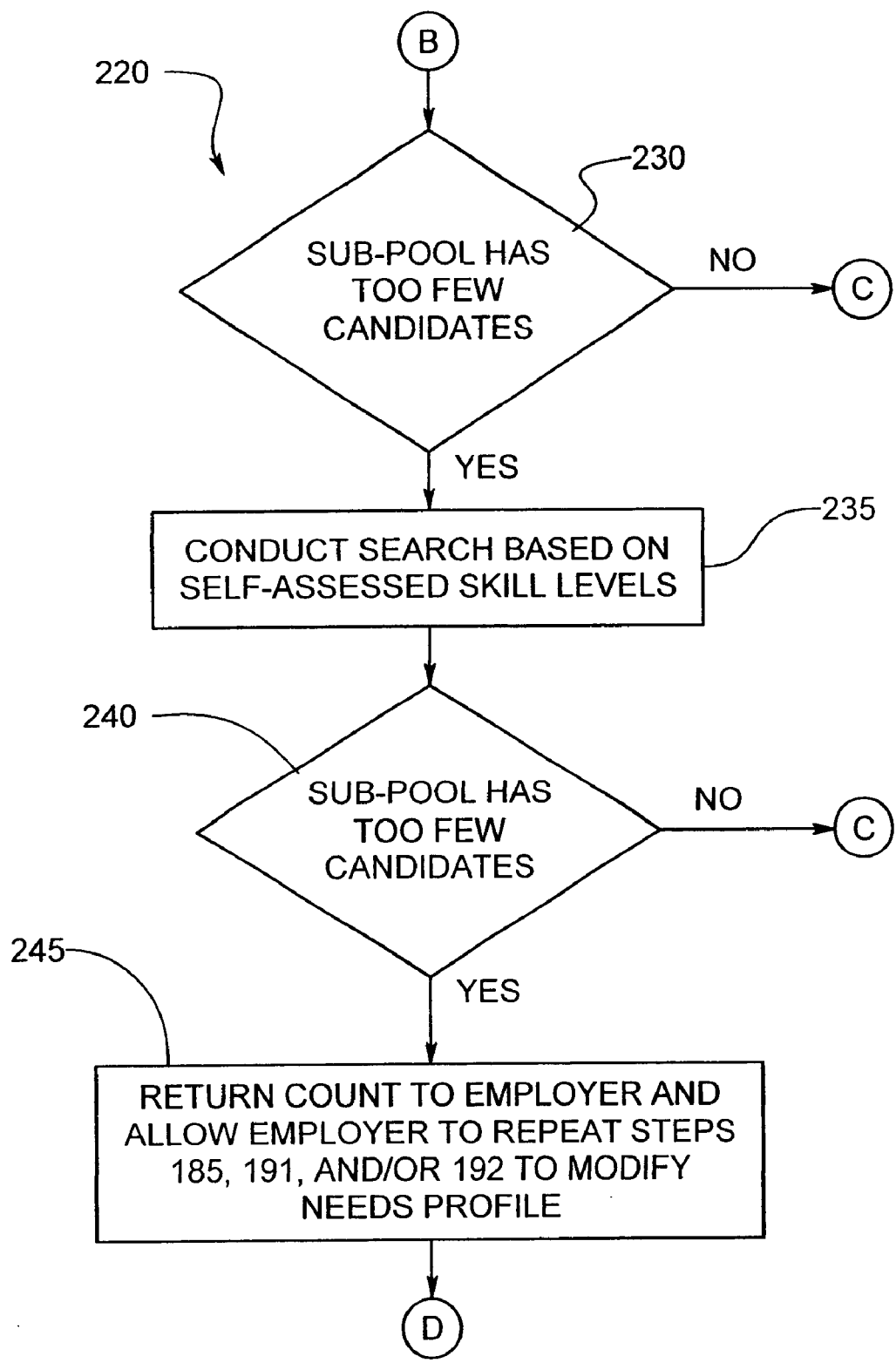
FIG. 4 is a flow chart illustrating a feedback process of the system and method according to the present invention.

The flow charts of FIGS. 2–4 illustrate a preferred method and system. More specifically, FIG. 2 illustrates a process 100 for gathering and storing needs data and skills data. FIG. 3 illustrates a process 200 for identifying the best qualified candidates for a position. FIG. 4 illustrates a process 300 for gathering feedback from employers and candidates and adjusting employers' needs data and candidates' skills data accordingly.

Data Gathering and Verification Phase

A candidate seeking a consulting or employment position visits the web site hosting the system. By identifying him/herself, the candidate is allowed to access, alter or author data in a record associated with him/herself. The candidate proceeds through a series of windows to fill in several tables or worksheets (FIGS. 5–8) with the skills that the candidate has and the level of skill he/she has for each skill. These steps are illustrated at reference numerals 101–105, and may be conducted in any order or sequence.

In step 101, the candidate enters the data illustrated in the "Technical Skill Evaluation" table 110 of FIG. 5. Technical skill table 110 has a column 115 identifying technical skills or tools, organized into appropriate categories. In this illustration for the world of information technology professionals, technical categories 120 include "hardware" 121, "operating systems" 122, "languages" 123, "applications" 124 and "others" 125 such as "testing, architecture, tools, methodologies, certifications, databases" and the like.

Under each skill category heading are a number of rows for receiving or selecting specific skills or tools from a pre-defined list of skills and tools. For example, under Operating System, in column 115, the candidate might enter "DOS" and "Windows 2000".

The technical skills table 110 further includes a column 130 for the number of years the candidate has been developing the specified skills or using the specified tool. The next column 140 in table 110, is for the skill level that the candidate believes he/she possesses for the specified skill (i.e. "self-assessed skill level"). The candidate selects the appropriate skill level from a list of pre-defined skill levels. The last column 150 of the table 110 embodiment illustrated in FIG. 5 is for assessment by a third party of the candidate's skills. An auxiliary information table 152 lists the pre-defined skill levels from which the candidate can choose and is preferably available or visible for the candidate's reference as he/she completes table 110. The auxiliary table 152 correlates a numerical value with described specific skill or experience levels. The table 152 illustrated in FIG. 5 shows four exemplary pre-defined skill levels are used: "novice", "limited", "experienced" and "expert".

Auxiliary table 152, and other auxiliary tables described below, are preferably available to the user for reference while he/she is filling in the main table that it accompanies. This auxiliary table, and the several auxiliary tables described throughout this description, may be shown next to the main table, or by providing drop-down or pop-up menus or the like to display the auxiliary table.

In the next step 102, illustrated in FIG. 2, the candidate enters industry or business skills in the industry skills evaluation table 155 illustrated in FIG. 6. Table 155 includes a first column 156 in which the candidate identifies industries in which he/she has experience. The second column 157 is for the role that the candidate played when working within the specified industry. Preferably, the candidate chooses a role from a list of pre-defined roles. Columns 159, 160 are for self-assessed skill level and third party-assessed skill level, respectively. The skill levels are preferably chosen from a list of pre-defined skill levels. The table 155 has a number of rows 161 to accommodate a list of multiple industries in which the candidate has experience. Two auxiliary information tables 162, 163 are preferably available for the candidate's reference as he/she completes table 155. The auxiliary table 162 lists pre-defined skill levels and correlates a numerical value with described specific skill or experience levels. The table 162 illustrated in FIG. 6 shows an exemplary list of skill levels including: "worked in the industry", "used industry-specific applications", "developed/implemented industry specific applications" and "designed/customized industry-specific applications". Auxiliary table 163 shows a pre-defined list of roles for the candidate to choose from.

In the next step 103 illustrated in FIG. 2, the candidate enters information about his/her communication and project leadership skills in the evaluation table 165 illustrated in FIG. 7. Table 165 includes a column 166 listing various communication and project leadership skills. Columns 168, 169 are for self-assessed skill level and third party-assessed skill level, respectively. Preferably, the skill levels for columns 168, 169 are selected from a list of pre-defined skill levels. Auxiliary table 170 shows a pre-defined list of skill levels for the candidate and the third-party assessor to choose from and correlates the skill levels to a numerical value. Preferably, auxiliary table 170 is available to or visible as the candidate or third-party assessor enters the skill levels 168, 169.

In step 104 illustrated in FIG. 2, the candidate enters project experience in the project experience evaluation table 172 illustrated in FIG. 8. Table 172 includes a column 173 which lists phases of typical information technology projects from requirement gathering to maintenance. For this table 172, the skill levels are in the form of the length of the project. Columns 176 allow the user to identify his/her length of involvement in project phases for his/her more recent projects. The user may leave blank phases in which he/she was not involved.

After the candidate has entered his/her skills date, the system "cross-validates" to make sure that the information the candidate has entered makes sense. It confirms that the amount of experience identified in one area is congruous with the amount of experience identified in a related area. If the system identifies incongruities, it queries the user as to whether the incongruous data should be modified. In addition, the system and method displays to the user the information entered by the user and invites the user to confirm or modify the data.

For each of tables 110, 155, 165, and 172, the third-party-assessed skill level is determined by an evaluation method such as an interview or testing, illustrated as step 180 in FIG. 2. In a preferred embodiment, the self-assessed scores will be compared to the third-party-assessed scores and, if there is a significant difference between the two, the third-party assessment will be repeated to determine if the first third-party assessment was in error.

The candidate's skills data is stored in a storage medium 182 in association with identifying information for the candidate. The third party assessment of the candidate's skill is similarly stored such that for each candidate and each skill both the self-assessed and the third party assessed skill levels are stored.

The method and system also includes the gathering of preference data for the candidate. For example, the preference data may include the dates of the candidate's availability, a list of one or more companies that the candidate does not wish to work for, a preferred geographic region of employment, the candidate's willingness to travel, the number of days or hours per week that the candidate wishes to work, and so forth.

The method and system also preferably includes a process to distinguish active candidates from inactive or unavailable candidates. For example, if a candidate accepts a position for an unspecified or ill-defined time period, that candidate is no longer available, and would be put on unavailable status. Of course, candidates may take positions that they found through other channels or may take vacations that also would make them unavailable. Preferably the system includes a check-in process by which a candidate will periodically, such as weekly, enter the system and indicate whether he/she is presently available to accept a position. Those candidates who do not make their periodic check-in for an extended period will automatically have their status changed to "inactive". The system can preferably generate reminders, such as via email, to candidates to make their periodic check-in.

Independently and in parallel, employers seeking to fill positions are entering data regarding the needs for the position. First, an employer identifies or selects skills that are desired for the position, as indicated at step 185, and then assigns to each selected skill a skill level or experience desired 191 and the importance or priority of that skill 192. FIG. 9 illustrates a "requirements" or "needs" table 186 for receiving such data. Table 186 includes a column 187 in which the employer identifies skills and tools desired for a position. The next column 188 identifies the minimum level of experience the position can tolerate. The next column 189 is for the importance of the skill desired for the specified position. Preferably, the importance of a skill may be chosen from a list of pre-defined values. In the illustrated example, the values used are "core strength", "experienced" and "beneficial", but it will be understood that these word labels can be altered within the spirit of this invention. Further, more or fewer pre-defined values may be used. The table 186 has a number of rows 190 to accommodate a list of multiple skills desired for the position. Preferably the skills are organized into categories, such as hardware, operating systems, languages, written skills, verbal skills, project leadership and project experience.

In an alternate embodiment, the system and method use artificial intelligence to query the employer about the employer's needs for a position. For example, if the employer indicates that a core strength for the position is in the area of graphical interface design, then the system recognizes that this project is in its early stages of development and proceeds to probe further with questions that are appropriate for such a project, such as methodology being used, industry knowledge and related technologies. A branching method is used by the system to access appropriate follow-up questions in light of information provided in earlier steps by the employer. This artificial intelligence method offers advantage because it assists employers in defining what they need for a particular position. An employer might not have recognized all of the skills they needed for a position, until they are prompted by the system.

Regardless of the method or system used to solicit the needs information from the employers, a numerical value is assigned to the pre-defined list of levels of importance and this is used as a maximum score as will be described below with reference to the data matching phase of the system and method. The table 192 illustrated in FIG. 10 is an example of the profile an employer might generate for a position. Table 192 has columns listing: categories of skills/experience 193; skills 194; the priority 195 ("core", "experienced", or "beneficial") of the listed skills; the minimum experience required 196; and the maximum numerical score 197 which correlates with the priority 195.

The example of FIG. 10 shows that Smalltalk language, Design Documents experience and experience in Requirements Gathering are "core strengths". "NT", "client server" architecture and experience in the analysis phase of a project as "experienced". "Method 1" methodology and experience in the airline industry would be "beneficial" for the job. This table also shows a total possible score 198 that is the sum of the maximum scores for each skill. This score is divided into 100 to obtain a normalization factor 199 to be used later in the matching phase.

In addition to skills information for a position, the position profile may also include additional parameters that the company uses to make hiring decisions. For example, many companies have prohibitions against hiring an employee for a contract position within a specified period after employment. To easily accommodate the incorporation of these kinds of parameters, the system and method includes a file or database for each employer that includes such global rules or preferences. This employer database is related to the position database or file, such that the positions database can access and use the information stored in the employer database for every position offered by a given employer.

The needs data entered by the employer for the position is stored 182 in a storage medium that may be the same as, or in data communication with, the storage medium in which the candidates' skills data is stored.

Data Matching Phase

The next phase of the method and system is illustrated by the flow chart of FIG. 3. Through automated data processing by a computing device, the candidates' records are searched 205 to find a sub-pool of candidates that possess the skills listed by the employer as desired for the position. A preferred method of finding this sub-pool involves searching all candidate records to find those that possess some threshold level of experience in the "core strengths" (i.e. those skills that are of the highest priority) for a position. Preferably this step of establishing the sub-pool also involves comparison of the candidate's preference data to the position data, and comparison of the company's global hiring rules or preferences to weed out any candidates that are not available, would not be interested in the position and/or do not meet the company's general hiring criteria (e.g. the candidate has been an employee recently and therefore cannot be offered a contract position).

The search will only return those candidates whose skills profiles matches or exceeds specified criteria. In a preferred embodiment, the candidates must have scores for their "core strength" skills that are adequately high, i.e. equal to or above the minimum defined by the administrator. Preferably, the third-party assessed skill levels are used.

This search for a sub-pool may generate too many or too few candidates and therefore a preferred embodiment of the system includes one or more feedback processes to accommodate such a situation. FIG. 4 illustrates a feedback process 220, that counts the number of candidates in the sub-pool and allows for modifications to yield a smaller or larger sub-pool. Specifically, after an employer has entered their needs data, the system searches the candidate records and counts the number of candidates who have the skills and skill levels to fit the needs profile. If the number is too small 230, the system conducts the search again 235 based on the self-assessed skill levels.

If the number in this sub-pool is still relatively large 240, the employer is given the option 245 to modify the needs profile such that it is likely to yield a smaller sub-pool. For example, the employer may raise the level of skill required for a skill, add skills to the list, and/or raise the level of importance of a skill. Conversely, if the sub-pool is relatively small, the employer can adjust the needs profile to yield a larger sub-pool.

Once a sub-pool of satisfactory size is identified, the next task is to determine which of the adequate candidates has skills and experience that most closely match what is needed or desired for a position. This is step 250 in FIG. 3. For each skill, the candidate's score is compared 250 to the maximum score needed by the employer. If the candidate's score exceeds the maximum score requested for a skill, then the system generates an adjusted score for that candidate for that skill that equals the maximum scored needed by the employer 255, 256. If the candidate's score does not exceed the maximum score for that skill, then the adjusted score for that skill equals the actual score. The adjusted score is stored 257; the candidate's actual score is not over-written and remains in the storage medium database. Preferably, the adjusted scores are stored only temporarily as candidates are evaluated for a particular position. Each candidate's adjusted skill scores are added together 258 to yield a total that is used to compare candidates 260. This information is provided to the employer who then selects 261 a candidate for the position or job.

The efficacy of this system and method is illustrated in the example of FIGS. 11a and 11b. FIG. 11a shows the candidates' actual skill scores; FIG. 11b shows the candidates' adjusted skill scores. Candidate 1 has a score of 10 for the skill of NT Hardware. This skill is only a "experienced" and not a "core strength" for the position that the employer is seeking to fill, and therefore the maximum score for this skill is a 5. Therefore, as shown in FIG. 11b, Candidate 1's score for Hardware-NT has been adjusted to equal that maximum: five. This comparison and adjustment is made for each candidate in this sub-pool for each skill.

As illustrated in FIG. 11a, using the candidates' actual scores, Candidate 5 scores the highest with a total of 65. Candidate 2 is tied for second place with Candidate 3 with a total score of 52. However, Candidate 5 is racking up points with significant experience in skills that are not needed for this position. Candidate 5 gets 10 points for his/her experience with Methodology Method 1, but he/she has less Smalltalk experience than the employer requested. Methodology Method 1 is merely "beneficial" to the employer for this position; in contrast, Smalltalk is a core strength. If the employer hired Candidate No. 5, the employer would get someone who was not adequate for the position even though he/she had a relatively high score for the aggregate of the skills desired. FIG. 11b shows adjusted scores and Candidate 2 has the highest adjusted score of 46. Candidate 2 meets the employer's needs for the skills that are of greatest importance for the position, i.e. those skills that are identified as "core strength".

Preferably, the apparatus, system and method provides links to the finalist candidates' resumes, for example in .pdf form, so that the employer can instantly view and/or print the resumes.

The apparatus, system and method provides instantaneous searching and matching. Immediately upon entry by the employer of their needs, the system conducts its first search to determine how many candidates are in the found sub-pool. If the employer is satisfied with this number, the employer authorizes the final matching phase and a "short list" of qualified candidates is immediately returned. Alternatively, the system administrator may choose to have this list returned to the system administrator rather than to the employer, so that the administrator can contact the candidates to confirm their availability before passing their names on to the employer.

The apparatus, system and method calculates a normalized score for each candidate in the short list, by dividing the candidate's total score (using adjusted values) by the maximum score that is achievable for the position and multiplied by 100 so the result is expressed as a percentage. In this manner, the candidate's score that is returned to the prospective employer is relative for the position they are seeking to fill, rather than absolute. Preferably, the apparatus, system and method then groups the candidates into normative ranges. For example, the data returned to the employer would indicate that Candidates A and B scored in the range of 90–100 percent, and Candidate C scored in the 85–90 percent range and Candidates D and E scored in the 80–85 percent range.

Preferably, the apparatus, system and method is also able to perform a market analysis for the combination of skills requested and return this information to the prospective employer to aid their final selection of a candidate from the short list. More specifically, the system will track the rates being charged by candidates and/or paid by employers for the combination of skills sought. For a given position, the system and method will find analogous positions previously filled to determine the market rate being charged/paid for such a position. When the system returns to the employer a final list of candidates, it will indicate that in general to obtain a 90% match with the needs identified for the position, the market price is x, and to obtain an 80% match the market price is y, and so forth. In this manner, the employer can compare the rates charged by each candidate to market rates to identify the candidate that offers the best value.

Feedback Processes

The system incorporates a number of feedback processes that are preferably incorporated into the system and method of the present invention.

A feedback process 220 to regulate the number of candidates returned in the sub-pool is discussed above and illustrated in FIG. 4.

Another feedback process provides information, preferably on a periodic basis, to candidates about the frequency with which their qualifications match what an employer is looking for. Specifically, this feedback process counts the number of times a candidate turns up in a sub-pool, and how often a candidate ends up in the final selection pool. The feedback system may show the candidate that he/she would have been considered for x percent more positions if they had y skill or if they had z level of experience in a skill they already possess. This information can be used by candidates to find out in what ways their skills are insufficient for the current market, and this will enable them to tailor their future instruction or training to acquire the skills or experience they are lacking.

In another feedback process, an employer can provide feedback about how a candidate fulfilled his/her responsibilities after a project is completed. This information can be used to update or modify the third party assessment of a candidate's skill level in their skills profile.

Although an illustrative version of the apparatus, system and device is shown, it should be clear that many modifications to the device may be made without departing from the scope of the invention.

What is claimed is:

1. A method for selecting a candidate for a position from a pool of candidates, comprising the steps of:
   a) establishing a database, said database having a record for each candidate in a pool and a record for a position to be filled by a candidate, wherein each candidate record includes a skills list of predefined skills and each record for the position includes a needs list of pre-defined skills needed for the position;
   b) assigning a priority value score for one or more skills needed for a position based on the importance of the skill for the position;
   c) for each candidate and for each predefined skill, assigning a skill value representing the skill level of the candidate for predefined skill;
   d) generating a position-specific adjusted skill score for any skill in which the candidate's skill level exceeds the skill value assigned by the employer for that skill for that position, said adjusted skill score being determined by adjusting the value of the candidate skill level such that the candidate skill level does not exceed the priority value needed by the employer; and
   e) comparing candidates according to the sum of their skill values, using adjusted skill values for those skills in which the candidate's skill value exceeds the priority value.

2. A system for selecting a candidate for a position from a pool of candidates comprising:
   a) means for assigning a priority value for one or more skills needed by an employer for a position based on the importance of the skill to the employer;
   b) means for assigning a skill value for each candidate representing the skill level of the candidate for that predefined skill;
   c) means for adjusting the value of the candidate skill level for any skill in which the candidate's skill level exceeds the priority value assigned by the employer, such that the candidate's skill level does not exceed the priority value;
   d) means for comparing candidates based on the sum of their adjusted skill values.

3. A method according to claim 1, further comprising the step of: assigning a numerical value to each said priority.

4. A method according to claim 3, wherein said priority is selected from a list including pre-defined choices of "core strength", "required" or "beneficial".

5. A candidate selection apparatus for selecting a candidate from a pool of candidates for a position that an employer seeks to fill, comprising:
   a) memory for storing database records including:
      (i) a candidates table identifying candidates and having a self-assessment of that candidate's level of skill in each of a plurality of pre-defined skills;
      (ii) a pre-defined needs table listing a plurality of skills needed for a position;
      (iii) a positions table of information identifying one or more positions sought to be filled by an employer, said positions table having, for each said position, a needs profile identifying one or more pre-defined skills desired for the position, the level of skill desired for each selected skill, and the priority of each selected skill to the position;
   b) means for receiving data from candidates about skills possessed and their skill levels for those skills;
   c) means for receiving data from an employer about a position to be filled;
   d) means for adjusting one or more candidates' skill levels to the maximum allowed for the skill in light of the priority given for a position;
   e) means for summing each candidate's skill levels, using adjusted skill levels for each skill in which a candidate's skill level exceeds the priority value for the position and comparing the candidates' sums to identify candidates who fit the needs profile for the position.

* * * * *